(12) United States Patent
Barton et al.

(10) Patent No.: US 12,471,015 B2
(45) Date of Patent: Nov. 11, 2025

(54) PROVIDING NETWORK SLICE ASSIGNMENT FOR A WIRELESS DEVICE BASED ON MANUFACTURER USAGE DESCRIPTION (MUD) PARAMETERS

(71) Applicant: Cisco Technology, Inc., San Jose, CA (US)

(72) Inventors: Robert Edgar Barton, Richmond (CA); Flemming Stig Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 455 days.

(21) Appl. No.: 18/172,612

(22) Filed: Feb. 22, 2023

(65) Prior Publication Data

US 2024/0284317 A1    Aug. 22, 2024

(51) Int. Cl.
*H04W 48/18* (2009.01)
*H04W 16/02* (2009.01)

(52) U.S. Cl.
CPC .......... *H04W 48/18* (2013.01); *H04W 16/02* (2013.01)

(58) Field of Classification Search
CPC .............................. H04W 48/18; H04W 16/02
See application file for complete search history.

(56) References Cited

U.S. PATENT DOCUMENTS

| | | | |
|---|---|---|---|
| 10,268,474 B2 | 4/2019 | Stammers et al. | |
| 10,917,317 B2 | 2/2021 | Stammers et al. | |
| 10,966,128 B2 * | 3/2021 | Zee ................... | H04W 36/0077 |

(Continued)

FOREIGN PATENT DOCUMENTS

| | | | | |
|---|---|---|---|---|
| CN | 114631364 A * | 6/2022 | ............ | H04W 76/18 |
| EP | 4250796 A1 * | 9/2023 | ............ | H04W 48/18 |

(Continued)

OTHER PUBLICATIONS

Hernández-Ramos, J., et al., IEEE Access "Defining the Behavior of IoT Devices Through the MUD Standard: Review, Challenges, and Research Directions," Digital Object Identifier 10.1109/ACCESS.2021.3111477, https://ieeexplore.ieee.org/document/9531614, Sep. 17, 2021, 20 pages.

(Continued)

*Primary Examiner* — Julio R Perez
(74) *Attorney, Agent, or Firm* — Edell, Shapiro & Finnan, LLC

(57) ABSTRACT

Provided herein are techniques to facilitate slice assignment for a wireless device based on Manufacturer Usage Description (MUD) parameters associated with the wireless device. In one instance, a method may include obtaining, by a provisioning server of a mobile network, a usage description object for a wireless device that has a session via an onboarding network slice of the mobile network in which the usage description object comprises usage parameters associated with the wireless device. The method may further include identifying, based on the usage parameters associated with the wireless device, a particular network slice that is to host the session for the wireless device and causing the session of the wireless device to be moved from the onboarding network slice to the particular network slice.

20 Claims, 5 Drawing Sheets

(56) References Cited

U.S. PATENT DOCUMENTS

| | | | |
|---|---|---|---|
| 12,028,341 B2* | 7/2024 | Kunz | H04L 63/0892 |
| 2014/0120994 A1* | 5/2014 | Song | A63F 13/573 |
| | | | 463/4 |
| 2019/0089747 A1 | 3/2019 | Wang et al. | |
| 2019/0104455 A1* | 4/2019 | Park | H04W 76/30 |
| 2021/0058984 A1 | 2/2021 | Lau et al. | |
| 2021/0144183 A1 | 5/2021 | Verma et al. | |
| 2022/0039177 A1* | 2/2022 | Talebi Fard | H04W 48/00 |
| 2022/0360562 A1 | 11/2022 | Hanes et al. | |
| 2023/0006889 A1* | 1/2023 | Thyagaturu | H04L 41/5054 |
| 2023/0078288 A1* | 3/2023 | Mildh | H04W 36/12 |
| | | | 370/331 |
| 2024/0284317 A1* | 8/2024 | Barton | H04W 16/02 |
| 2025/0016644 A1* | 1/2025 | Panchal | H04W 76/12 |

FOREIGN PATENT DOCUMENTS

| | | | | |
|---|---|---|---|---|
| IL | 266392 A * | 6/2019 | | H04W 36/142 |
| WO | WO-2018148011 A1 * | 8/2018 | | H04W 60/00 |

OTHER PUBLICATIONS

V. I., Rajesh, et al., "Supporting Dynamic Network Slicing and Policy Creation for End Devices in Private 5G Networks," Technical Disclosure Commons, Defensive Publications Series, https://core.ac.uk/display/234669480, Jul. 18, 2019, 7 pages.

Nick VS Networking, "5G Subscriber Identifiers—SUCI & SUPI," Telco Network Engineering, Acronyms and cryptography—a look at Subscriber Identifiers in 5G, https://nickvsnetworking.com/5g-subscriber-identifiers-suci-supi/, Nov. 28, 2020, 10 pages.

Lear, E., et al., "Manufacturer Usage Description Specification," Network Working Group, draft-ietf-opsawg-mud-25, https://www.rfc-editor.org/rfc/rfc8520.html, Jun. 15, 2018, 70 pages.

Lear, E., et al., "Manufacturer Usage Description Specification," Internet Engineering Task Force (IETF), https://datatracker.ietf.org/doc/rfc8520/, Mar. 2019, 60 pages.

3GPP, "3rd Generation Partnership Project; Technical Specification Group Core Network and Terminals; Numbering, addressing and identification; (Release 18)," TS 23.003 V18.0.0, Dec. 2022, 150 pages.

3GPP, "3rd Generation Partnership Project; Technical Specification Group Services and System Aspects; System architecture for the 5G System (5GS); Stage 2 (Release 18)," TS 23.501 V18.0.0, Dec. 2022, 593 pages.

Gaber, C., et al., "Liability-Aware Security Management for 5G," Zurich University of Applied Sciences, Winterthur, Switzerland, https://ieeexplore.ieee.org/document/9221407, Sep. 10-12, 2020 Conference, 6 pages.

3GPP, "3rd Generation Partnership Project; Technical Specification Group Services and System Aspects; Procedures for the 5G System (5GS); Stage 2 (Release 18)," TS 23.502 V18.0.0, Dec. 2022, 773 pages.

Wikipedia, "SCADA," Supervisory control and data acquisition, https://en.wikipedia.org/wiki/SCADA, retrieved from the Internet on Jan. 25, 2023, 11 pages.

Rao, A., "5G network slicing: cross-domain orchestration and management will drive commercialization," White paper, Research, Analysys Mason Limited, Sep. 2020, 22 pages.

\* cited by examiner

ENHANCED NETWORK SLICE
DEFINITION INFORMATION
250

251 — {IPV4 ACL SUPPORT: 1[YES]/0[NO]};
252 — {IPV6 ACL SUPPORT: 1[YES]/0[NO]};
253 — {DNS-BASED ACL SUPPORT: 1[YES]/0[NO]};
254 — {STATEFUL ACCESS CONTROL SUPPORT: 1[YES]/0[NO]};
255 — {ALLOWED FIXED DESTINATIONS:
   [CLOUD SERVICE PROVIDER A; SERVICE X1; PROTOCOL Y1; PORT Z1]
   [EQUIPMENT MANUFACTURER B; SERVICE X2; PROTOCOL Y2; PORTS Z2-Z3]};
256 — {MUD EXTENSIONS SUPPORT: [LIST OF CURRENT/FUTURE
   MUD EXTENSIONS SUPPORTED]};
...

FIG. 2B

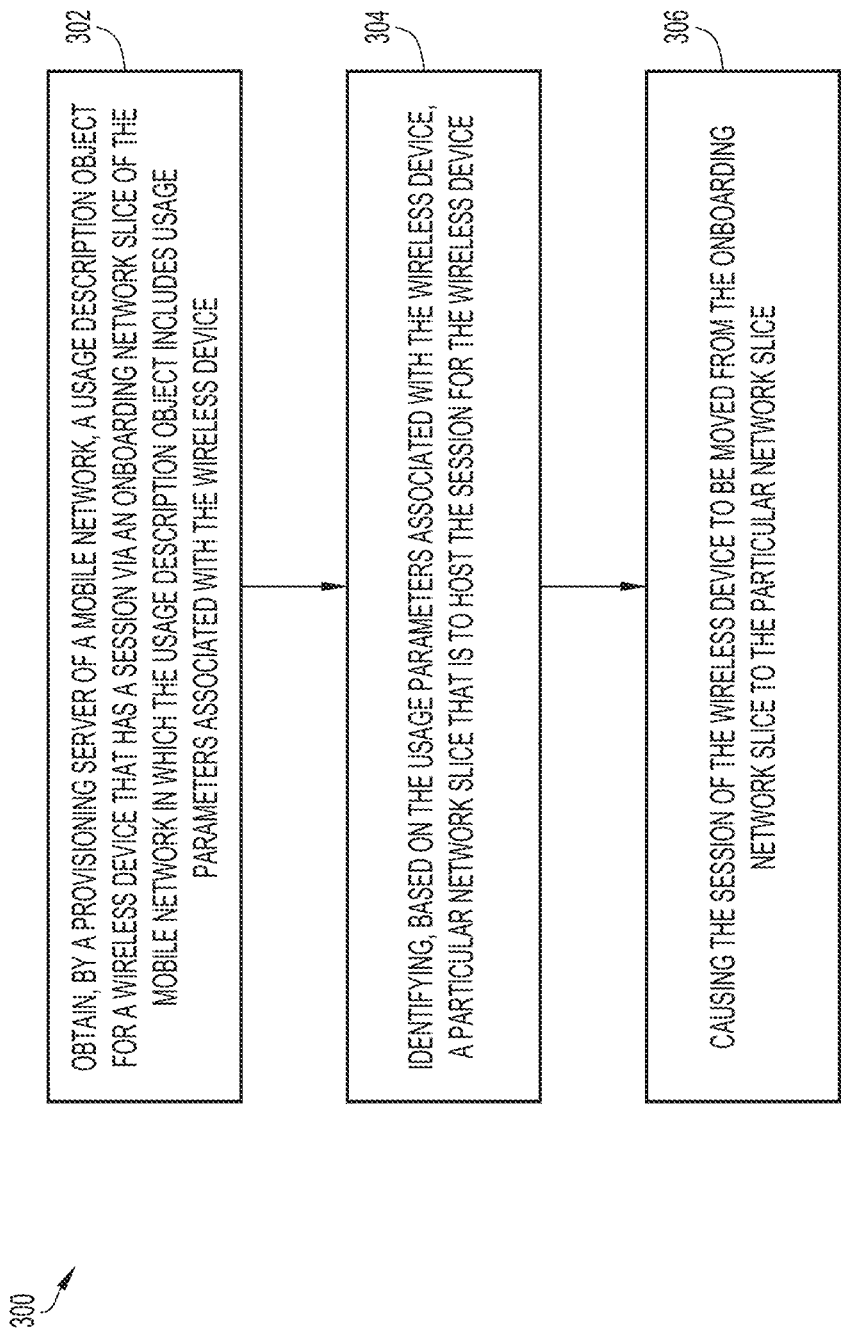

PROVIDING NETWORK SLICE ASSIGNMENT FOR A WIRELESS DEVICE BASED ON MANUFACTURER USAGE DESCRIPTION (MUD) PARAMETERS

TECHNICAL FIELD

The present disclosure relates to network equipment and services.

BACKGROUND

Networking architectures have grown increasingly complex in communication environments. In particular, network slicing is a networking concept that has been introduced for Third Generation Partnership Project (3GPP) mobile networks, such as 3GPP Fifth Generation (5G) mobile networks. With the introduction of network slicing architectures, there are significant challenges in managing network slice communications and connectivity for wireless devices.

BRIEF DESCRIPTION OF THE DRAWINGS

FIG. 2B is a schematic diagram illustrating example details for enhanced network slice definition information including usage parameters that can be utilized to facilitate network slice assignment, according to an example embodiment.

FIG. 3 is a flowchart depicting a method according to an example embodiment.

DETAILED DESCRIPTION

Overview

Figure 1:
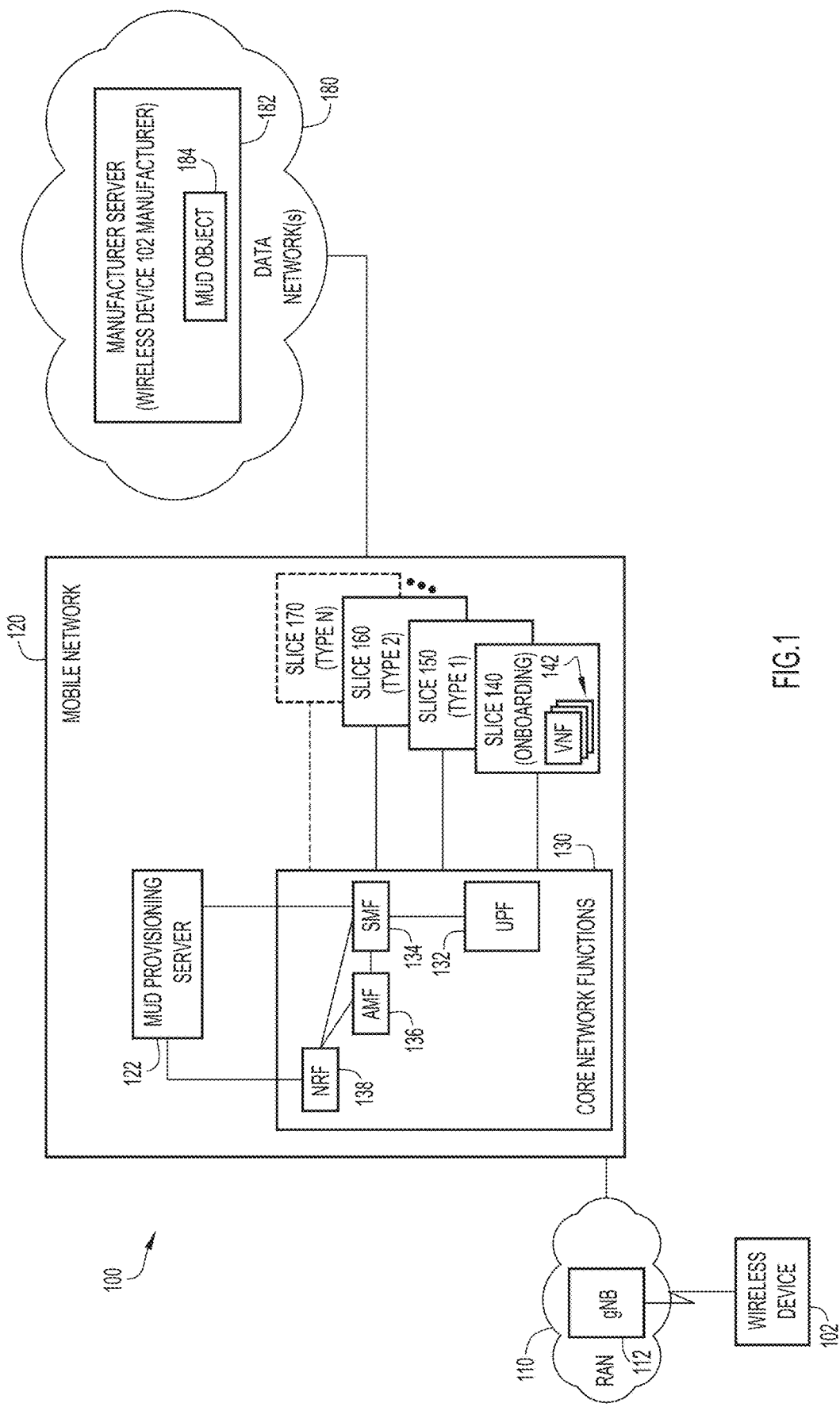
FIG. 1 is a block diagram of a system that may facilitate network slice assignment for a wireless device based on usage parameters associated with the wireless device, according to an example embodiment.

Provided herein are techniques through which during onboarding and/or provisioning of wireless devices that may be seeking connection with a mobile network (e.g., a Third Generation Partnership Project (3GPP) Fourth Generation (4G)/Long Term Evolution (LTE), Fifth Generation (5G), Sixth Generation (6G), next Generation (nG), or the like mobile network) can be "held" in an onboarding network slice until wireless devices are profiled. For example, for a wireless device seeking connection with the mobile network, the profiling can be facilitated using manufacturer usage description (MUD) parameters and/or information obtained for the wireless device in which the MUD parameters/information may include, among other information, usage parameters/information associated with the wireless devices (e.g., port numbers that are to be opened for a wireless device, allowable communication protocols for a wireless device, device type of a wireless device, peer-to-peer communication capabilities for a wireless device, etc.). Through the profiling, the usage parameters can be compared/mapped against parameters stored for network slices in order to determine an appropriate network slice that is to provide service for the wireless device.

In one embodiment, for example, a computer-implemented method is provided that may include obtaining, by a provisioning server of a mobile network, a usage description object for a wireless device that has a session via an onboarding network slice of the mobile network, wherein the usage description object comprises usage parameters associated with the wireless device; identifying, based on the usage parameters associated with the wireless device, a particular network slice that is to host the session for the wireless device; and causing the session of the wireless device to be moved from the onboarding network slice to the particular network slice. In one instance, the usage description object is a Manufacturer Usage Description (MUD) object.

Example Embodiments

Network slicing is a key concept in Third Generation Partnership Project (3GPP) mobile core network architectures. A network slice is a logical end-to-end network, often instantiated via a combination of virtualized network functions, that can be dynamically created and may include any combination of 3GPP mobile core network functions/functionality. Generally, a network slice, also referred to generally as a 'slice', 'instantiated slice', or 'slice instance' or variations thereof, can refer to a group or set of Virtualized Network Functions (VNFs) that are configured and instantiated in order to facilitate a certain mobile network service or group of mobile network services. As referred to herein, a mobile core network can be referred to interchangeably as a mobile network.

During operation for a wireless device seeking connection with a mobile network, a communication session, typically referred to as Packet Data Network (PDN) sessions for 4G/LTE mobile networks or Protocol Data Unit (PDU) sessions for 5G/6G/etc. can be established via a particular network slice that has been instantiated within the mobile network for a particular network slice type in which the instantiated slice for the slice type can provide certain mobile network services to the wireless device and other wireless devices.

A network slice instance that has been instantiated within a Public Land Mobile Network (PLMN) can include any combination of core network control plane and user plane network functions. Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST) indication that indicates the expected slice behavior for a slice requested by a UE in terms of expected features and services, and, optionally, can include a Slice Differentiator (SD), which can be used to differentiate among multiple slices of a same SST. Different types of slices (slice types) can be configured for a mobile network such that each slice type can provide certain mobile network services. As referred to herein and in the claims, the terms 'slice', 'slice instance', 'instantiated slice', and/or variations thereof may be used interchangeably to refer to a type of slice that is instantiated (e.g., configured, created, validated, operated, managed, etc.) within a mobile core network in order to provide one or more mobile network services for one or more user equipment.

Various example slice types can include, but not be limited to, a cellular vehicle to everything (V2X) slice type that can provide cellular V2X services, a massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be configured/instantiated by a mobile network operator that may or may not conform to standards-based slice types.

Non-human/non-user-based wireless devices, such as wireless IoT devices can often connect to 3GPP mobile core networks in order to establish communication sessions with the mobile core network. In current implementations, however, wireless IoT devices are often limited to identifying themselves to a mobile network (for registration/connection establishment with the mobile network) using an International Mobile Subscriber Identity (IMSI, for 4G/LTE networks), a Subscription Permanent Identifier (SUPI, for 5G/6G/etc. networks), a Subscription Concealed Identifier (SUCI, for 5G/6G/etc. networks), an International Mobile station Equipment Identity (IMEI), and/or an IMEI and Software Version number (IMEISV), which can limit the ability of a mobile core network to provision wireless IoT devices to a correct/appropriate network slice and/or for providing appropriate network services for such devices.

Wireless IoT devices may support the retrieval of usage parameters for such devices, which may be provided via a usage description object or file, such as Manufacturer Usage Description (MUD) object or file (also referred to herein as a MUD configuration file), as prescribed at least by Internet Engineering Task Force (IETF) Request for Comments (RFC) 8520, published March 2019, that can include various usage parameters and/or information associated with a wireless IoT device (e.g., security parameters, communication parameters, device type parameters, device manufacturer information, QoS parameters, etc.), but such information is typically used to facilitate network security configurations, such as configuring access control lists (ACLs), firewall settings, etc. Such usage or MUD parameters are not currently used in provisioning wireless IoT devices to a correct/appropriate network slice and/or for providing appropriate network services for such devices.

In accordance with embodiments herein, various techniques are provided through which usage parameters that can be obtained for a wireless device (e.g., a wireless IoT device) can be used to identify an appropriate network slice for a mobile network that is to host a communication session for the wireless device. The usage parameters for the wireless device can be obtained via a usage description object or file, such as a MUD object or file, obtained for the wireless device. Thus, embodiments herein may provide for the ability to extend MUD integration to support 3GPP mobile network slice mappings.

Referring to FIG. 1, FIG. 1 is a block diagram of a system 100 that may facilitate network slice assignment for wireless device onboarding based on usage parameters associated with the wireless device, such as MUD parameters, according to an example embodiment. System 100 may include a wireless device 102, a Radio Access Network (RAN) 110, a mobile network 120, and one or more data networks 180.

In at least one embodiment, RAN 110 may include a radio node, such as a gNB 112 (sometimes referred to as a gNodeB). In at least one embodiment, mobile network 120 may include a MUD provisioning server 122, core network functions 130, and any number of instantiated network slices, such as a network slice 140, a network slice 150, and a network slice 160. Other network slices may be instantiated in mobile network 120, such as a network slice 170, as discussed in certain examples herein. Each network slice instantiated within mobile network can be considered a network slice type such that the network slice type may be configured to provide various network services according to the network slice type. For example, network slice 140 may be considered an onboarding network slice type, network slice 150 may be considered another network slice type (e.g., Type 1), network slice 160 may be considered yet another network slice type (e.g., Type 2), and network slice 170 may be considered yet another network slice type (e.g., Type N) in which each different type of network slices may provide different network services than other network slice types.

In at least one embodiment, data networks 180 may include a manufacturer server 182 that is operated/managed by a manufacturer of the wireless device 102. The manufacturer server 182 can store MUD objects/files for devices manufactured by the manufacturer, such as a MUD object 184 configured by the manufacturer that includes usage parameters and/or information for wireless device 102. Data networks 180 of FIG. 1 may include any combination of the Internet, a gaming network, an Internet Protocol (IP) Multimedia Subsystem (IMS), an Ethernet data network (not shown), Ethernet switching system(s) (not shown), and/or the like.

In at least one embodiment, core network functions 130 may include a User Plane Function 132, a Session Management Function (SMF) 134, an Access and Mobility Management Function (AMF) 136, and a Network Repository Function 138. Each network slice instantiated for mobile network 120 may include any combination of VNFs, such as VNFs 142 as illustrated for network slice 140. Although not shown in FIG. 1, it is to be understood that network slices 150, 160, and 170 may include any combination of VNFs.

Each network slice 140, 150, 160, and 170 (if instantiated) may be considered a particular slice type that is configured to provide one or more particular services. For example, slice 140 can be a default or onboarding slice type that may have limited communication capabilities and can be used to "hold" wireless devices seeking connection with mobile network 120 until the security posture of the wireless devices is determined via usage parameters, such as MUD parameters, after which the devices can be mapped to an appropriate network slice and moved (e.g., via movement of sessions for the devices) to the appropriate network slice to provide particular services to the wireless devices.

Various VNFs that can be configured for a slice type in accordance with any embodiments described herein can include any combination of 3GPP 4G/LTE VNFs (e.g., Mobility Management Entity (MME) VNFs, control/user plane Serving Gateway (SGW) VNFs, control/user plane PDN Gateways (PGW) VNFs, Policy and Control Rules Function (PCRF) VNFs, Home Subscriber Server (HSS) VNFs, etc.), 5G VNFs (e.g., AMF VNFs, SMF VNFs, VNFs, Policy Control Function (PCF) VNFs, Unified Data Management (UDM) entity VNFs, NRF VNFs, etc.), 6G VNFs, etc., as may be prescribed, at least in part, by 3GPP standards now known or hereinafter developed.

Generally, gNB 112 interfaces with core network functions 130 of mobile network 120, such as AMF 136 and UPF 132 (and/or any UPF of any network slice). Any of the core network functions 130 may interface with any VNFs of any of network slices 140, 150, 160, and 170 (if instantiated). MUD provisioning server 122 may also interface with core network functions 130, including, but not limited to, NRF 138 and SMF 134. In various embodiments, MUD provisioning server 122 may interface with NRF 138 and SMF 134 using any combination of an Application Programming Interface (API) and/or Remote Authentication Dial-in User Service (RADIUS) interface. MUD provisioning server 122 may also interface with any VNFs of any of network slices 140, 150, 160, and 170. In at least one embodiment, SMF 134 and UPF 132 may be implemented as VNFs of onboarding network slice 140. Any elements, functions, slices, etc. of mobile network may also interface with data networks 180. In particular, MUD provisioning server 122 can interface with manufacturer server 182 in accordance with embodiments herein.

Generally, RAN 110 may include any combination of one or more 3GPP 5G/nG gNodeB or gNB, such as gNB 112 and/or 3GPP 4G/LTE evolved node Bs (eNodeBs or eNBs), not shown, to facilitate network connectivity between wireless device 102 and mobile network 120. A gNodeB/eNodeB, such as gNB 112, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more wireless devices, such as wireless device 102, may utilize to connect to RAN 110 for one or more sessions (e.g., voice, video, data, gaming, combinations thereof, etc.) with a mobile network, such as mobile network 120.

A wireless device, such as wireless device 102, may also be referred to as a user equipment (UE) and may be considered any electronic device, etc. that initiates a connection or communication session to mobile network 120, such as a computer, an electronic device such as an industrial device (e.g., a robot), automation device, enterprise device, appliance, Internet of Things (IOT) device (e.g., sensor, monitor, meter (parking meter, gas meter, water meter, etc.), traffic light, camera/surveillance device, smart device, etc.), a router with a WWA/WLA interface, a WWA/WLA (cellular/Wi-Fi®) enabled device and/or any other device, component, element, or object capable of initiating voice, audio, video, media, or data exchanges within system 100. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as gNB 112 of RAN 110, for one or more sessions with a mobile core network, such as mobile network 120.

In addition to various operations discussed for techniques herein, an AMF, such as AMF 136, may facilitate access and mobility management control/services for one or more wireless devices, such as wireless device 102, for connection of wireless device 102 with any of network slice(s) 140, 150, 160, 170, etc. of mobile network 120. In addition to various operations discussed for techniques herein, an SMF, such as SMF 134 (and any other SMFs discussed herein) may be responsible for wireless device session management, with individual functions/services being supported on a per-session basis in order to facilitate data transfer(s) between a wireless device and one or more data network(s) 180 via one or more UPFs. Generally, a UPF, such as UPF 132 (and any other UPFs discussed herein) may operate to provide packet routing and forwarding operations for user data traffic and may also perform a variety of functions such as packet inspection, traffic optimization, QoS, policy enforcement and user data traffic handling (e.g., to/from one or more data network(s) 180), and billing operations (e.g., accounting, etc.) for wireless device sessions. Typically, an NRF, such as NRF 138 provides support for network function (NF) management (e.g., registering, deregistering, updating services to NFs/NF services/network slices), NF and/or network slice discovery (e.g., enabling NF/network slice consumer(s) to discover/be assigned a set of NF instances or slice instances), among other services.

Broadly during operation of various embodiments herein, MUD provisioning server 122 can provide for the ability to obtain a usage description object/configuration file for a wireless device, such as MUD object 184 for wireless device 102, and can use usage parameters/information contained in the usage description object (e.g., security parameters, communication parameters, device type parameters, device manufacturer information, QoS parameters, etc.) to determine the usage/security posture of the wireless device in order to identify an appropriate network slice that is to provide service for the wireless device via mobile network 120 or, stated differently, that is to host the session for the wireless device. Upon determining the appropriate network slice that is to host the session for the wireless device, the MUD provisioning server 122 can cause session for the wireless device to be moved from a temporary onboarding network slice (e.g., network slice 140) to the appropriate network slice determined by MUD provisioning server 122.

In some embodiments, operations herein may involve the MUD provisioning server 122 determining that an appropriate network slice that is to host the session for a wireless device is not yet instantiated in the mobile network 120. In such instances, MUD provisioning server 122 can facilitate instantiation of the appropriate network slice (and registration of the network slice within NRF 138) using any techniques now known in the art or hereinafter developed and can cause the session of the wireless device to be moved to the appropriate network slice.

Figure 2A:
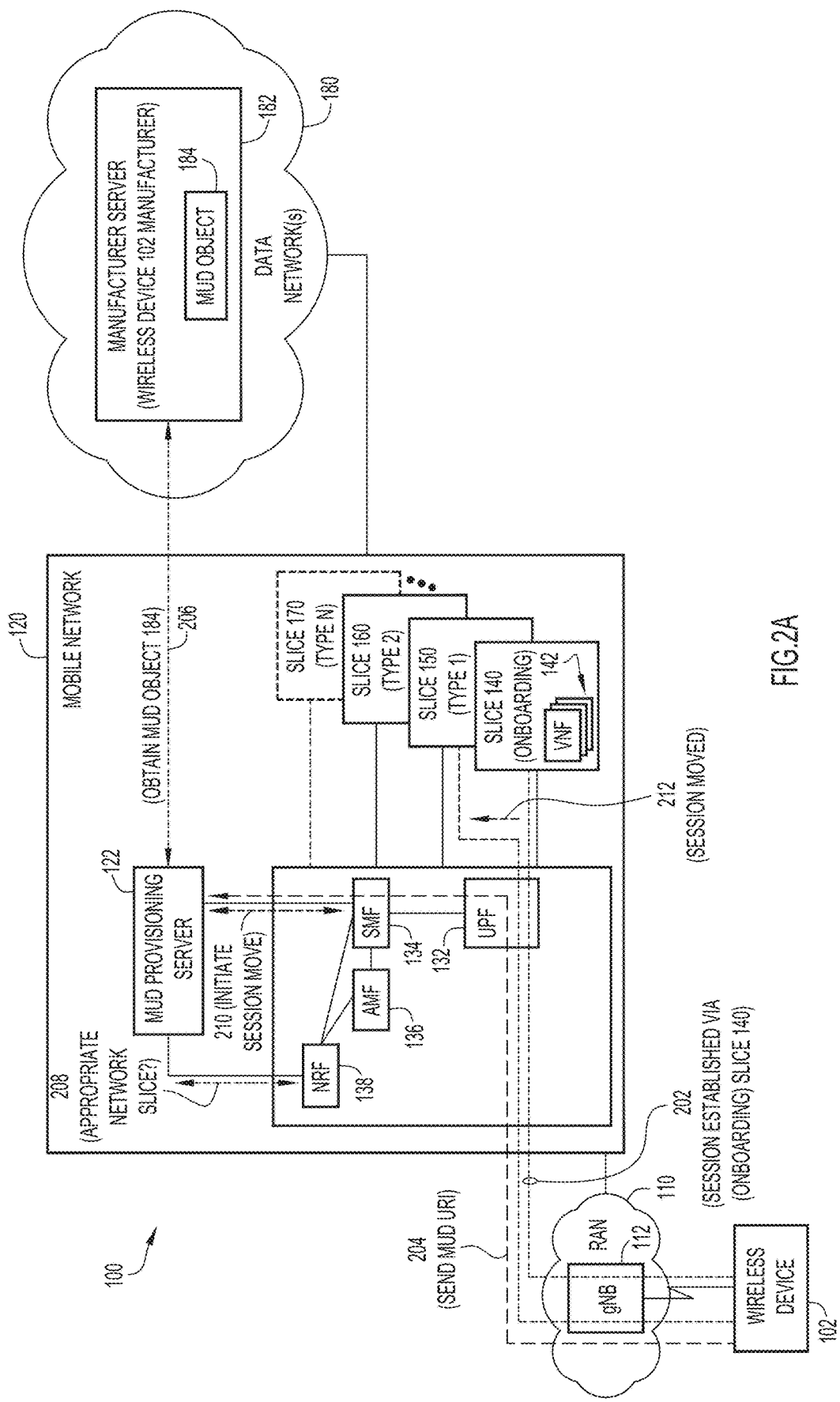
FIG. 2A is a block diagram illustrating example operations that may be performed via the system of FIG. 1 in order to facilitate network slice assignment for the wireless device based on usage parameters associated with the wireless device, according to an example embodiment.

With reference to FIG. 2A, consider various example operations that may be performed via system 100 in accordance with embodiments herein in order to facilitate network slice assignment for wireless device 102 based on usage parameters that can be determined from a usage description object, such as MUD object 184, associated with the wireless device 102. For the present example, wireless device 102 can be considered an intelligent IoT UE/device.

At the time of onboarding, the type of wireless device 102 and its security posture is unknown to mobile network 120. Because the use and security posture of the device is unknown, the wireless device 102 is provisioned to the network slice 140, which can be configured as an onboarding, default, or otherwise isolated network that provides minimal communication privileges to wireless device 102. For example, as shown at 202, consider that wireless device 102 connects to mobile network 120 and a session is established for the wireless device 102 via an onboarding slice, such as network slice 140.

In at least one embodiment, core network functions 130, such as AMF 136 and SMF 134 may facilitate registration of wireless device 102 with mobile network and session establishment via the (onboarding) network slice 140. For example, during registration, AMF 136 can access a UDM entity (not shown) using an identifier for the wireless device 102 (e.g., IMSI/SUCI/etc.) to determine that the wireless device is to be onboarded and held in network slice 140, which can be configured as a temporary onboarding slice in which the wireless device 102 can be held until the use and security posture of the wireless device 102 is determined.

For embodiments herein, wireless device 102 is configured to support MUD operations. As such, once wireless device 102 is connected to the mobile network 120 (e.g., via the session established at 202), the wireless device 102 can issue/transmit a MUD Uniform Resource Identifier (URI) that is to be intercepted by the MUD provisioning server 122, as shown at 204, that includes an internet/web address for the wireless device 102 manufacturer's website associated with manufacturer server 182 (e.g., "www.mfg182server.com/mudobject184") that can be used by MUD provisioning server 122 to obtain a usage description object or configuration file for wireless device 102 from manufacturer server 182, such as MUD object 184 maintained/stored by manufacturer server that includes various usage parameters and/or information from which the use and security posture of wireless device 102 can be determined.

In one embodiment, wireless device 102 can be configured to send the MUD URI upon establishing a session with mobile network 120 in which the UPF 132 can detect the MUD URI and forward the MUD URI to MUD provisioning server 122. In another embodiment, MUD provisioning server 122 can send a request message to wireless device 102 to query the wireless device 102 to send the MUD URI, to which the wireless device can respond to MUD provisioning server 122 with a response message including the MUD URI.

Upon obtaining the MUD URI, the MUD provisioning server 122 obtains the MUD object 184 for wireless device 102 from the manufacturer server 182 using the MUD URI, as generally illustrated at 206. As noted above, MUD configuration objects/files typically provide security information about a device, such as port numbers that are to be opened, communication protocols, etc. that can be mapped to a set of network or firewall ACLs that can be provisioned in a network.

In accordance with embodiments herein, MUD provisioning server 122 examines the MUD object 184 to determine usage parameters/information for wireless device 102 (e.g., security requirements/parameters, communication parameters, device type parameters, device manufacturer information, QoS parameters, etc. contained within the MUD object 184) to determine if an appropriate network slice exists/is currently instantiated that meets the constraints for providing service to the wireless device 102 as identified via the usage parameters/information contained within the MUD object 184.

For example, as shown at 208, MUD provisioning server 122 communicates with NRF 138 to determine whether an appropriate network slice is instantiated that meets the usage parameters/information contained in MUD object 184 such that the NRF 138 can examine all instantiated network slices using the usage parameters/information to determine if an existing network slice meets the constraints contained in the usage parameters/information.

In accordance with embodiments herein, network slice definitions for instantiated network slices that are registered/stored in NRF 138 can be enhanced with usage parameters/information that can be contained in usage description objects (e.g., MUD objects) obtained for wireless devices that may be seeking connection to mobile network. Such enhanced slice definitions can allow the MUD provisioning server 122 to confirm whether a network slice exists/is instantiated that meets the criteria (e.g., security capabilities, communication protocols, etc.) contained in the MUD object 184 for wireless device 102 and, thus, is to host the session for the wireless device 102.

FIG. 2B illustrates example enhanced network slice definition information 250 that may be provided for network slice definitions stored via an NRF (e.g., for network slice 150 and network slice 160 definitions stored via NRF 138) such that the network slice definitions can include usage parameters/information that may be contained in usage description/MUD objects (e.g., security parameters/definitions/constraints, peer-to-peer communication abilities, allowable protocols, allowable ports, device types, etc.).

For example, such enhanced network slice definition information 250 stored via an NRF may include an indication 251 that indicates whether a given network slice provides IPv4 (Internet Protocol version 4) Access Control List (ACL) support (e.g., {IPv4 ACL Support: 1/0}, set to '1' to indicate YES (IPv4 ACL support is provided) or set to '0' to indicate NO (IPv4 ACL support is not provided)). In another example, an indication 252 can be provided for an NRF slice definition that indicates whether a given network slice provides IPv6 (Internet Protocol version 6) ACL support (e.g., {IPv6 ACL Support: 1/0}, set to '1' to indicate YES (IPv6 ACL support is provided) or set to '0' to indicate NO (IPv6 ACL support is not provided)). In yet another example, an indication 253 can be provided for an NRF slice definition that indicates whether a given network slice provides Domain-Name System (DNS)-based ACL support, such that DNS names can be provided in ACLs (e.g., {DNS-based ACL Support: 1/0}, set to '1' to indicate YES (DNS-based ACL support is provided) or set to '0' to indicate NO (DNS-based ACL support is not provided)).

In still another example, an indication 254 can be provided for an NRF slice definition that indicates whether a given network slice provides stateful access control support, for example, firewall operation, rather than basic ACLs (e.g., {Stateful Access Control Support: 1/0}, set to '1' to indicate YES (stateful access control support is provided) or set to '0' to indicate NO (stateful access control support is not provided)). In yet another example, an indication 255 can be provided that indicates one or more pre-provisioned ACLs that can be supported by a given network slice, in which a pre-provisioned ACL can identify any combination of a destination to which an ACL may apply (e.g., a cloud service provider, an equipment manufacturer, etc.), one or more service(s) to which an ACL may apply, one or more protocol(s) to which an ACL may apply, one or more port(s) to which an ACL may apply, and/or any other identifier that may be utilized to configure an ACL. In some examples, ACL(s) may be configurable such that they may be provisioned on-the-fly. In yet another example, an indication 256 can be provided for an NRF 138 slice definition that indicates whether a given network slice supports one or more MUD extensions, including currently defined MUD (e.g., extensions as may be defined in RFC 8520) and/or may be defined in the future.

The example indications discussed for FIG. 2B are provided for illustrative purposes only and are not meant to limit the broad scope of embodiments herein. It can be envisioned that other slice definition information may be provided for slice definitions stored in an NRF. In some embodiments, network slices that support/include usage parameters/information that may be contained in usage description/MUD objects (e.g., security parameters/definitions/constraints, peer-to-peer communication abilities, allowable protocols, allowable ports, device types, etc.) can be used to define new Slice Differentiators (SDs) and/or new Slice/Service Types (SSTs).

Returning to FIG. 2A, in at least one embodiment for the operations at 208, MUD provisioning server 122 can communicate a query to the NRF 138 that includes the usage parameters/information associated with wireless device 102 that are contained in the MUD object 184 and the NRF 138 can examine the slice definitions for instantiated network slices (e.g., network slice 150 and network slice 160) to determine whether the usage parameters/information configured in the slice definitions for any of the instantiated network slices satisfies or matches the usage parameters/information contained in the MUD object 184 for wireless device. If a match is found in the slice definitions stored by the NRF 138 for instantiated network slices 150 and 160 (e.g., one of the network slices supports/provides/includes slice definition information that matches the parameters contained in the MUD object 184), the NRF 138 can identify the network slice to the MUD provisioning server 122 and the MUD provisioning server 122 can communicate with the SMF 134 (e.g. via an API, via RADIUS attributes, etc.), as generally illustrated at 210, to ask the SMF 134 to initiate moving the session for the wireless device 102 to the appropriate network slice meeting the usage parameters/information (e.g., security parameters/requirements, communication parameters, QoS parameters, etc.). For example, for the embodiment of FIG. 2A, consider that a match is found between the parameters contained in the MUD object and parameters/information configured for network slice 150 in this example, which triggers MUD provisioning server 122 to communicate with SMF 134 to initiate moving the session for wireless device 102 to network slice 150, as generally illustrated at 212. In at least one embodiment, the SMF 134 can cause the session of the wireless device to be moved from the onboarding network slice to the particular network slice by instructing the wireless device, using standards-based communications, to register again with the mobile network 120 using the appropriately identified network slice. In at least one embodiment, the session for the wireless device 102 involving network slice 150 can involve a different UPF for network slice 150 (other than or in addition to UPF 132).

In at least one other embodiment for the operations at 208, MUD provisioning server 122 can communicate a query to the NRF 138 requesting the NRF 138 to provide slice definitions for all instantiated network slices within mobile network 120 such that the MUD provisioning server 122 can perform the comparison/matching in order to determine whether usage parameters/information configured in the slice definitions for any of the instantiated network slices satisfy or match the usage parameters/information contained in the MUD object 184.

In some instances, a network slice satisfying the usage parameters/information contained in a MUD object for a wireless device may not currently be instantiated in mobile network 120. In such instances, MUD provisioning server 122 can communicate with one or more core network functions 130 of mobile network 120 (e.g., SMF 134, AMF 136, NRF 138, and/or any other network functions as may be applicable under 3GPP standards) in order to provision/cause instantiation of a new network slice that satisfies the usage parameters/information for the wireless device, such as network slice 170 in one example.

The newly instantiated network slice can be configured with the usage parameters/information (e.g., security constraints, communication parameters, QoS parameters, etc.) as mandated by the MUD object for the wireless device and can be registered in the NRF 138 and configured with the usage parameters/information contained in/demanded by the MUD object for the wireless device. When the new slice has been created/instantiated and registered in the NRF 138, the MUD provisioning server 122 can communicate with the SMF 134, to requesting that session for the wireless device be moved from the onboarding network slice to the newly provisioned network slice.

MUD provisioning server 122 can facilitate instantiation of the appropriate network slice (and registration of the network slice within NRF 138) using any techniques now known in the art or hereinafter developed and can cause the session of the wireless device to be moved to the appropriate network slice. For example, in some instances, MUD provisioning server 122 may be configured with various network slice definitions that identify VNF(s) that are to be configured for different various network slice types and may identify usage parameters/information that can be associated/correlated to each network slice type such that the MUD provisioning server 122 can cause an appropriate network slice to be configured, instantiated, and provisioned with appropriate parameters within mobile network 120.

Thus, through embodiments herein, MUD provisioning server 122 can translate/map usage parameters/information contained in a MUD object obtained for a wireless device to 3GPP slice definitions in order to identify an appropriate network slice that is to host the session for the wireless device. Upon identifying an appropriate network slice that is to host a session for a wireless device, such as wireless device 102, the MUD provisioning server 122 (via SMF 134) can cause the session for the wireless device 102 to be moved from the (onboarding) network slice 140 to an appropriate network slice that is to host the session, which may, in some instances include causing instantiation of a new network slice to host the session for the wireless device.

Referring to FIG. 3, FIG. 3 is a flowchart depicting a method according to an example embodiment. In at least one embodiment, method 300 may be associated with techniques that may be utilized to facilitate network slice assignment for a wireless device based on usage parameters associated with the wireless device, according to an example embodiment. In various embodiments, method 300 may be performed by a computing device or combination of computing devices as discussed for embodiments herein, such as MUD provisioning server 122, SMF 134, and/or any other elements discussed herein.

At 302, the method may include, obtaining, by a provisioning server of a mobile network (e.g., MUD provisioning server 122), a usage description object for a wireless device that has a session via an onboarding network slice of the mobile network (e.g., MUD object 184 for wireless device 102) in which the usage description object includes usage parameters associated with the wireless device. The usage description object can be obtained for the wireless device using a MUD URI obtained from the wireless device to query a manufacturer's server in order to retrieve the usage description object from the server.

At 304, the method may include identifying, based on the usage parameters associated with the wireless device, a particular network slice that is to host the session for the wireless device. In some embodiments, an NRF, such as NRF 138 can compare usage parameters/information contained in a MUD object for a wireless device against usage parameters/information defined for instantiated network slices within a mobile network in order to identify to a MUD provisioning server, such as MUD provisioning server 122, a particular network slice that is to host the session for the wireless device. In some embodiments, the NRF can identify network slices that are instantiated in a mobile network and their corresponding slice definitions to the MUD provisioning server such that the MUD provisioning server can identify an appropriate network slice that is to host the session for the wireless device based on the usage parameters/information contained in the MUD object obtained for the wireless device.

At 306, the method can include causing the session of the wireless device to be moved from the onboarding network slice to the particular network slice. In some embodiments, the causing can include a MUD provisioning server, such as MUD provisioning server 122, requesting an SMF, such as SMF 134 to move the session for the wireless device to the particular network slice. In some embodiments, the causing can include the MUD provisioning server causing instantiation of the particular network slice within the mobile network and thereafter requesting the SMF to move the session of the wireless device to the appropriate network slice.

Accordingly, embodiments herein provide a mechanism to translate a MUD security description into a slice definition, or a slice assignment-either a pre-existing one, or a new one if an existing slice does not meet the MUD parameters obtained for a wireless device. Usage parameters, such as a security description, communication information, device capabilities, etc. can be added to the slice inventory in the NRF, allowing for the ability to compare a slice security posture with the MUD object obtained for a wireless device.

By augmenting slice descriptors for existing instantiated network slices maintained in the NRF registry to include usage parameters (e.g., security policy information, isolation policy information, communication policy information, etc.), the NRF can be explored to determine if a candidate network slice is instantiated that satisfies the MUD profile parameters for a wireless device. If no network slice is currently instantiated that satisfies the parameters, the MUD provisioning server can orchestrate a new slice creation/instantiation within the mobile network and can cause the session for the wireless device to be moved to the new network slice and the NRF can be updated with the newly configured slice information (e.g., including common descriptor information that reflects the MUD object).

Thus, broadly, embodiments herein may include various operations, including, but not limited to parsing a MUD object/file obtained for a wireless device, comparing parameters of the MUD object/file with network slice definitions in the NRF that have been augmented to include usage parameters/information (e.g., security definitions, communication protocol definitions, device type definitions, device capability definitions, etc.), mapping the wireless device to a compliant slice, possibly, if no compliant slice exists, generating/instantiating a new network slice and updating the NRF accordingly, and causing the session for the wireless device to be moved to the compliant network slice.

Figure 4:
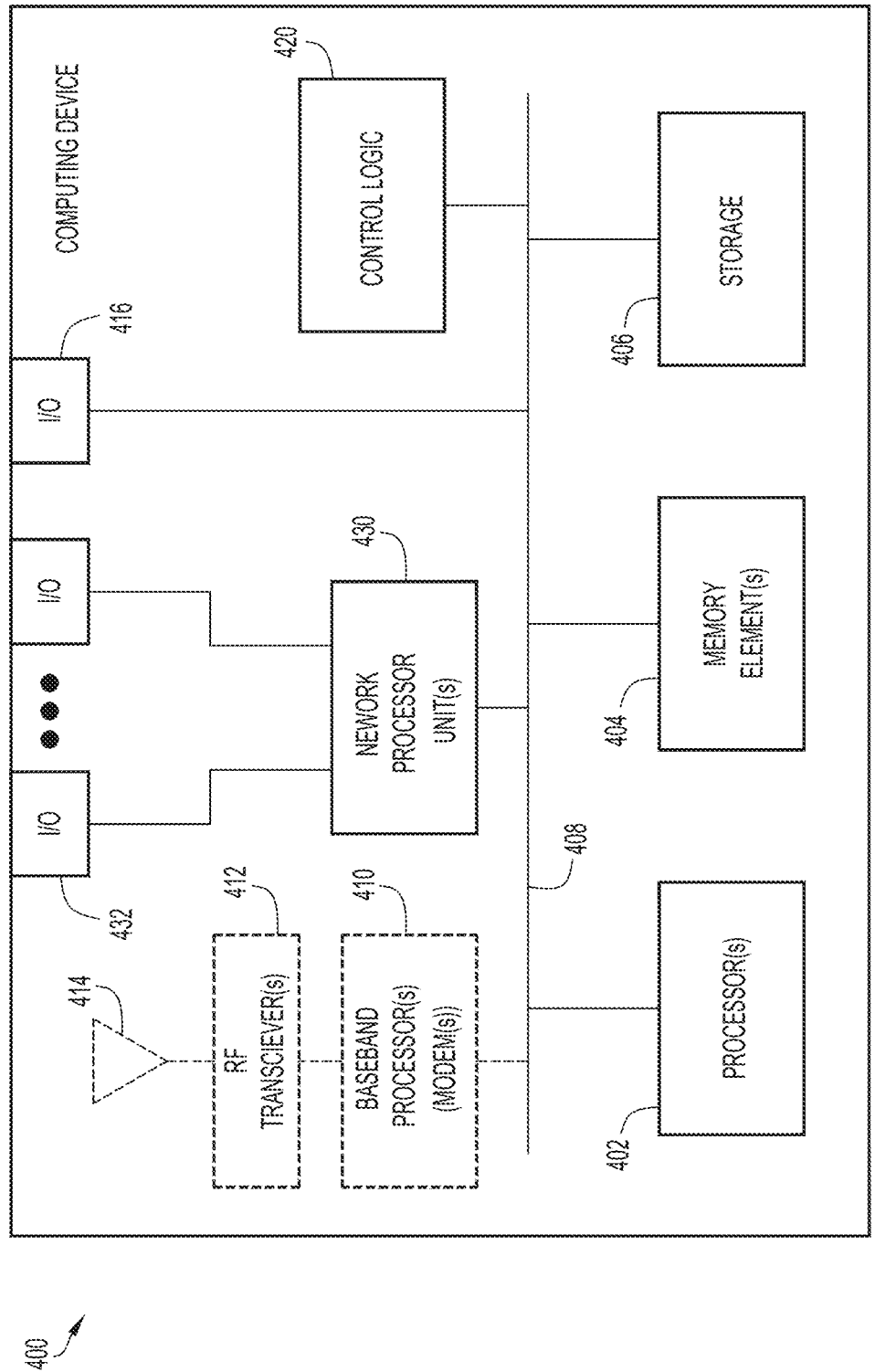
FIG. 4 is a hardware block diagram of a computing device that may perform functions associated with any combination of operations discussed in connection with techniques described for embodiments herein.

Referring to FIG. 4, FIG. 4 illustrates a hardware block diagram of a computing device 400 that may perform functions associated with operations discussed herein in connection with the techniques depicted in FIGS. 1, 2A, and 3. In various embodiments, a computing device or apparatus, such as computing device 400 or any combination of computing devices 400, may be configured as any entity/entities as discussed for the techniques depicted in connection with FIGS. 1, 2A and 3 in order to perform operations of the various techniques discussed herein, such as MUD provisioning server 122, wireless device 102, manufacturer server 182, any core network functions 130, and/or any VNFs configured for any network slices.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a provisioning server of a mobile network, a usage description object for a wireless device that has a session via an onboarding network slice of the mobile network, wherein the usage description object comprises usage parameters associated with the wireless device; identifying, based on the usage parameters associated with the wireless device, a particular network slice that is to host the session for the wireless device; and causing the session of the wireless device to be moved from the onboarding network slice to the particular network slice. In one instance, the usage description object is a Manufacturer Usage Description (MUD) object.

In one instance, the identifying includes querying a Network Repository Function (NRF) by the provisioning server to determine whether any network slice of a plurality of network slices instantiated for the mobile network satisfies the usage parameters associated with the wireless device, wherein network slice description information stored in the NRF includes usage parameter information configured for each of the plurality of network slices instantiated for the mobile network. In one instance, the querying includes comparing the usage parameters associated with the wireless device that are included in the usage description object with the usage parameters defined for each of the plurality of network slices instantiated for the mobile network to determine whether the usage parameters associated with the wireless device match usage parameters defined for any network slice of the plurality of network slices instantiated for the mobile network.

In one instance, upon determining that no network slice of the plurality of network slices instantiated for the mobile network satisfies the usage parameters associated with the wireless device, the causing includes instantiating the particular network slice that is to host the session for the wireless device.

In one instance, obtaining the usage description object includes the provisioning server obtaining a Uniform Resource Identifier (URI) from the wireless device and initiating a query using the URI to obtain the usage description object for the wireless device. The obtaining includes the provisioning server querying the wireless device for a Uniform Resource Identifier (URI) and initiating a query using the URI to obtain the usage description object for the wireless device.

In one instance, causing the session of the wireless device to be moved from the onboarding network slice to the particular network slice includes the provisioning server requesting a session management function (SMF) of the mobile network to move the session of the wireless device from the onboarding network slice of the mobile network to the particular network slice of the mobile network.

The usage parameters associated with the wireless device can identify one or more of: one or more port numbers that are to be opened for the session for the wireless device; one or more communication protocols that are to be utilized for the session for the wireless device; or whether the wireless device is capable of peer-to-peer communications; or a type of the wireless device.

Accordingly, embodiments herein may provide for the ability to hold a wireless device session in an onboarding network slice while the posture of the device is determined. Various novel features of embodiments herein may include, but not be limited to, configuring enhanced slice definitions for the NRF to include MUD usage parameters for different network slices (e.g., security definitions/parameters, communication parameters, device type parameters, device capabilities, quality of service (QOS) parameters, etc.); facilitating interactions between the a MUD provisioning server and an SMF to cause the SMF to move a wireless device session to a network slice that meets the usage parameters for the device (which exceeds or otherwise enhanced the current intended design of MUD parameters as currently used for configuring ACLs, etc.); and/or, for instances in which a compliant network slice may not be instantiated within a mobile network, embodiments herein facilitate interactions/operations by the MUD provisioning server with 3GPP/5G packet core network functions to automatically create/instantiate an appropriate network slice and subsequently cause a session for a wireless device to be moved to the newly created slice and to update the NRF with slice definition information for the newly created slice.

Advantageously, embodiments herein provide for the ability to examine the security profile and isolation for each of each of a plurality of network slices that can be instantiated in a mobile network by augmentation to the NRF, where security/isolation/communication/etc. definitions and/or descriptors can be added to assist in determining compliance of a network slice to meet a device's security/communication/capability/etc. posture. If a network slice is positively found that supports the MUD security, etc. posture (such as when adding IoT devices to an existing slice that already has similar devices), the MUD provisioning server can simply cause the session for a wireless device to be moved to the compliant network slice. However, if a slice cannot be found that meets the posture of the MUD policy, a new slice can be generated/instantiated with the correct isolation profile. In this case, a new slice can be instantiated in the mobile network and registered within the NRF with augmented slice definitions/descriptors that add the appropriate isolation information for the new network slice. Such operations are an extension to how MUD is traditionally used in networks, which is traditionally focused on the generation of ACLs based on a device's security profile.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a provisioning server of a mobile network, a usage description object for a wireless device that has a session via an onboarding network slice of the mobile network, wherein the usage description object comprises usage parameters corresponding to the wireless device;
identifying, based on the usage parameters corresponding to the wireless device, a particular network slice that is to host the session for the wireless device; and
moving the session of the wireless device from the onboarding network slice to the particular network slice, wherein the moving includes the provisioning server requesting a session management function (SMF) of the mobile network to move the session of the wireless device from the onboarding network slice of the mobile network to the particular network slice of the mobile network.

2. The method of claim 1, wherein the identifying includes:
  querying a Network Repository Function (NRF) by the provisioning server to determine whether any network slice of a plurality of network slices instantiated for the mobile network satisfies the usage parameters corresponding to the wireless device, wherein network slice description information stored in the NRF includes usage parameter information configured for each of the plurality of network slices instantiated for the mobile network.

3. The method of claim 2, wherein the querying includes comparing the usage parameters corresponding to the wireless device that are included in the usage description object with the usage parameters defined for each of the plurality of network slices instantiated for the mobile network to determine whether the usage parameters corresponding to the wireless device match the usage parameters defined for any network slice of the plurality of network slices instantiated for the mobile network.

4. The method of claim 2, wherein upon determining that no network slice of the plurality of network slices instantiated for the mobile network satisfies the usage parameters corresponding to the wireless device, the moving includes instantiating the particular network slice that is to host the session for the wireless device.

5. The method of claim 1, wherein the obtaining includes the provisioning server obtaining a Uniform Resource Identifier (URI) from the wireless device and initiating a query using the URI to obtain the usage description object for the wireless device.

6. The method of claim 1, wherein the obtaining includes the provisioning server querying the wireless device for a Uniform Resource Identifier (URI) and initiating a query using the URI to obtain the usage description object for the wireless device.

7. The method of claim 1, wherein the usage description object is a Manufacturer Usage Description (MUD) object.

8. The method of claim 1, wherein the usage parameters corresponding to the wireless device identify one or more of:
  one or more port numbers that are to be opened for the session for the wireless device;
  one or more communication protocols that are to be utilized for the session for the wireless device;
  whether the wireless device is capable of peer-to-peer communications; or
  a type of the wireless device.

9. One or more non-transitory computer readable storage media encoded with instructions that, when executed by a processor, cause the processor to perform operations, comprising:
  obtaining, by a provisioning server of a mobile network, a usage description object for a wireless device that has a session via an onboarding network slice of the mobile network, wherein the usage description object comprises usage parameters corresponding to the wireless device;
  identifying, based on the usage parameters corresponding to the wireless device, a particular network slice that is to host the session for the wireless device; and
  moving the session of the wireless device from the onboarding network slice to the particular network slice, wherein the moving includes the provisioning server requesting a session management function (SMF) of the mobile network to move the session of the wireless device from the onboarding network slice of the mobile network to the particular network slice of the mobile network.

10. The media of claim 9, wherein the identifying includes:
  querying a Network Repository Function (NRF) by the provisioning server to determine whether any network slice of a plurality of network slices instantiated for the mobile network satisfies the usage parameters corresponding to the wireless device, wherein network slice description information stored in the NRF includes usage parameter information configured for each of the plurality of network slices instantiated for the mobile network.

11. The media of claim 10, wherein the querying includes comparing the usage parameters corresponding to the wireless device that are included in the usage description object with the usage parameters defined for each of the plurality of network slices instantiated for the mobile network to determine whether the usage parameters corresponding to the wireless device match the usage parameters defined for any network slice of the plurality of network slices instantiated for the mobile network.

12. The media of claim 11, wherein upon determining that no network slice of the plurality of network slices instantiated for the mobile network satisfies the usage parameters corresponding to the wireless device, the moving includes instantiating the particular network slice that is to host the session for the wireless device.

13. The media of claim 9, wherein the usage description object is a Manufacturer Usage Description (MUD) object.

14. A system comprising:
  at least one memory element for storing data; and
  at least one processor for executing instructions associated with the stored data, wherein executing the instructions causes the system to perform operations, comprising:
    obtaining, by a provisioning server of a mobile network, a usage description object for a wireless device that has a session via an onboarding network slice of the mobile network, wherein the usage description object comprises usage parameters corresponding to the wireless device;
    identifying, based on the usage parameters corresponding to the wireless device, a particular network slice that is to host the session for the wireless device; and
    moving the session of the wireless device from the onboarding network slice to the particular network slice, wherein the moving includes the provisioning server requesting a session management function (SMF) of the mobile network to move the session of the wireless device from the onboarding network slice of the mobile network to the particular network slice of the mobile network.

15. The system of claim 14, wherein the identifying includes:
  querying a Network Repository Function (NRF) by the provisioning server to determine whether any network slice of a plurality of network slices instantiated for the mobile network satisfies the usage parameters corresponding to the wireless device, wherein network slice description information stored in the NRF includes usage parameter information configured for each of the plurality of network slices instantiated for the mobile network.

16. The system of claim 15, wherein the querying includes comparing the usage parameters corresponding to the wireless device that are included in the usage description object with the usage parameters defined for each of the plurality of network slices instantiated for the mobile network to determine whether the usage parameters corresponding to the wireless device match the usage parameters defined for any network slice of the plurality of network slices instantiated for the mobile network.

17. The system of claim 16, wherein upon determining that no network slice of the plurality of network slices instantiated for the mobile network satisfies the usage parameters corresponding to the wireless device, the moving includes instantiating the particular network slice that is to host the session for the wireless device.

18. The system of claim 14, wherein the usage description object is a Manufacturer Usage Description (MUD) object.

19. The system of claim 14, wherein the obtaining includes one of:
   the provisioning server obtaining a Uniform Resource Identifier (URI) from the wireless device and initiating a query using the URI to obtain the usage description object for the wireless device; or
   the provisioning server querying the wireless device for a Uniform Resource Identifier (URI) and initiating a query using the URI to obtain the usage description object for the wireless device.

20. The system of claim 14, wherein the usage parameters corresponding to the wireless device identify one or more of:
   one or more port numbers that are to be opened for the session for the wireless device;
   one or more communication protocols that are to be utilized for the session for the wireless device;
   whether the wireless device is capable of peer-to-peer communications; or
   a type of the wireless device.

\* \* \* \* \*